(12) United States Patent
Chen

(10) Patent No.: US 6,644,614 B1
(45) Date of Patent: Nov. 11, 2003

(54) POSITIONING DEVICE FOR A MICROPHONE

(75) Inventor: Mike Chen, Taipei (TW)

(73) Assignee: Yoga Electronics Co., Ltd., Taipei (TW)

( * ) Notice: Subject to any disclaimer, the term of this patent is extended or adjusted under 35 U.S.C. 154(b) by 0 days.

(21) Appl. No.: 10/143,987

(22) Filed: May 14, 2002

(51) Int. Cl.$^7$ .................................................. A47G 1/10
(52) U.S. Cl. ............................. 248/316.1; 248/229.1; 381/361
(58) Field of Search ........................... 248/316.1, 316.8, 248/229.1, 229.2, 229.11, 309, 205.5; 381/361, 362, 366

(56) References Cited

U.S. PATENT DOCUMENTS 4,811,405 A * 3/1989 Peiker
6,257,535 B1 * 7/2001 Jaing
6,498,859 B2 * 12/2002 Kuerti et al.

OTHER PUBLICATIONS

Patent application Publication No. US 2002/0168079 A1 to Kuerti et al.; Publication Date Nov. 14, 2002.*

* cited by examiner

Primary Examiner—Ramon D. Ramirez
(74) Attorney, Agent, or Firm—Lowe Hauptman Gilman & Berner, LLP

(57) ABSTRACT

A positioning device for a microphone includes a mounting plate having a connecting plate section mounted detachably and securely on a horizontal mounting portion of a clamp unit, and a holding plate section that extends outwardly from the connecting plate section, that is formed with an elongated slot extending along the length of the holding plate section, and that is connected to the microphone at one side of the elongated slot. An adjuster bolt is disposed at the other side of the elongated slot, extends through the elongated slot, and threadedly engages a base of the microphone so as to permit adjustment of the position of the microphone relative to the clamp unit along the elongated slot.

5 Claims, 5 Drawing Sheets

POSITIONING DEVICE FOR A MICROPHONE

BACKGROUND OF THE INVENTION

1. Field of the Invention

The present invention relates to a positioning device, more particularly to a positioning device for a microphone.

2. Description of the Related Art

Referring to FIG. 1, a conventional positioning device is shown to include a clamp 82 and a C-shaped holding seat 83 fixed to the clamp 82. A microphone 81 can be disposed and held in the holding seat 83.

The aforesaid conventional positioning device is disadvantageous in that position of the microphone 81 relative to the clamp 82 cannot be adjusted.

SUMMARY OF THE INVENTION

The main object of this invention is to provide a positioning device which is adapted to hold a microphone thereon, and which is capable of permitting adjustment of position of the microphone relative to a clamp unit thereof.

Accordingly, a positioning device of the present invention is adapted to be used for positioning a microphone which has a base formed with a threaded mounting hole. The positioning device includes a clamp unit, a mounting plate, and an adjuster bolt. The clamp unit includes a horizontal mounting portion. The mounting plate has a connecting plate section mounted detachably and securely on the horizontal mounting portion of the clamp unit, and a holding plate section that extends outwardly from the connecting plate section and that is formed with an elongated slot extending along the length of the holding plate section. The holding plate section is adapted to be connected to the base of the microphone on one side of the elongated slot. The adjuster bolt is disposed on the other side of the elongated slot, extends through the elongated slot in the holding plate section, and is adapted to threadedly engage the threaded mounting hole in the base of the microphone so as to permit adjustment of the position of the microphone relative to the clamp unit along the elongated slot.

BRIEF DESCRIPTION OF THE DRAWINGS

These and other features and advantages of this invention will become apparent in the following detailed description of the preferred embodiment of this invention, with reference to the accompanying drawings, in which.

DETAILED DESCRIPTION OF THE PREFERRED EMBODIMENTS

Figure 1:
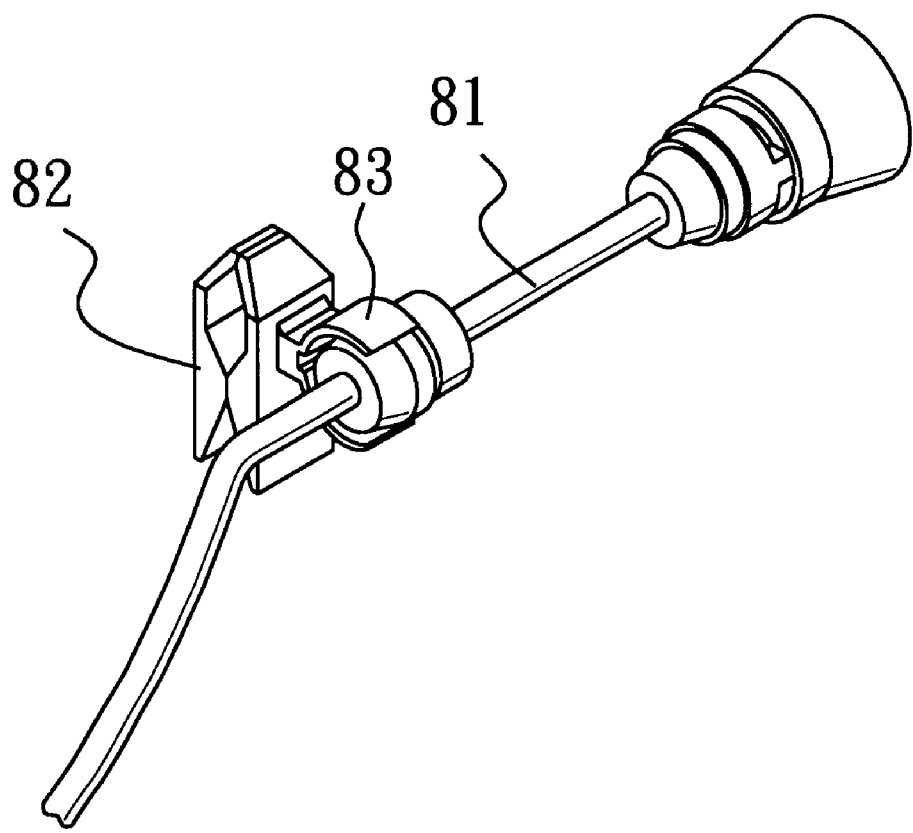
FIG. 1 is a perspective view of a conventional positioning device for holding a microphone.

Before the present invention is described in greater detail with reference to the following preferred embodiments, it should be noted that same reference numerals have been used to denote similar elements throughout the specification.

Figure 2:
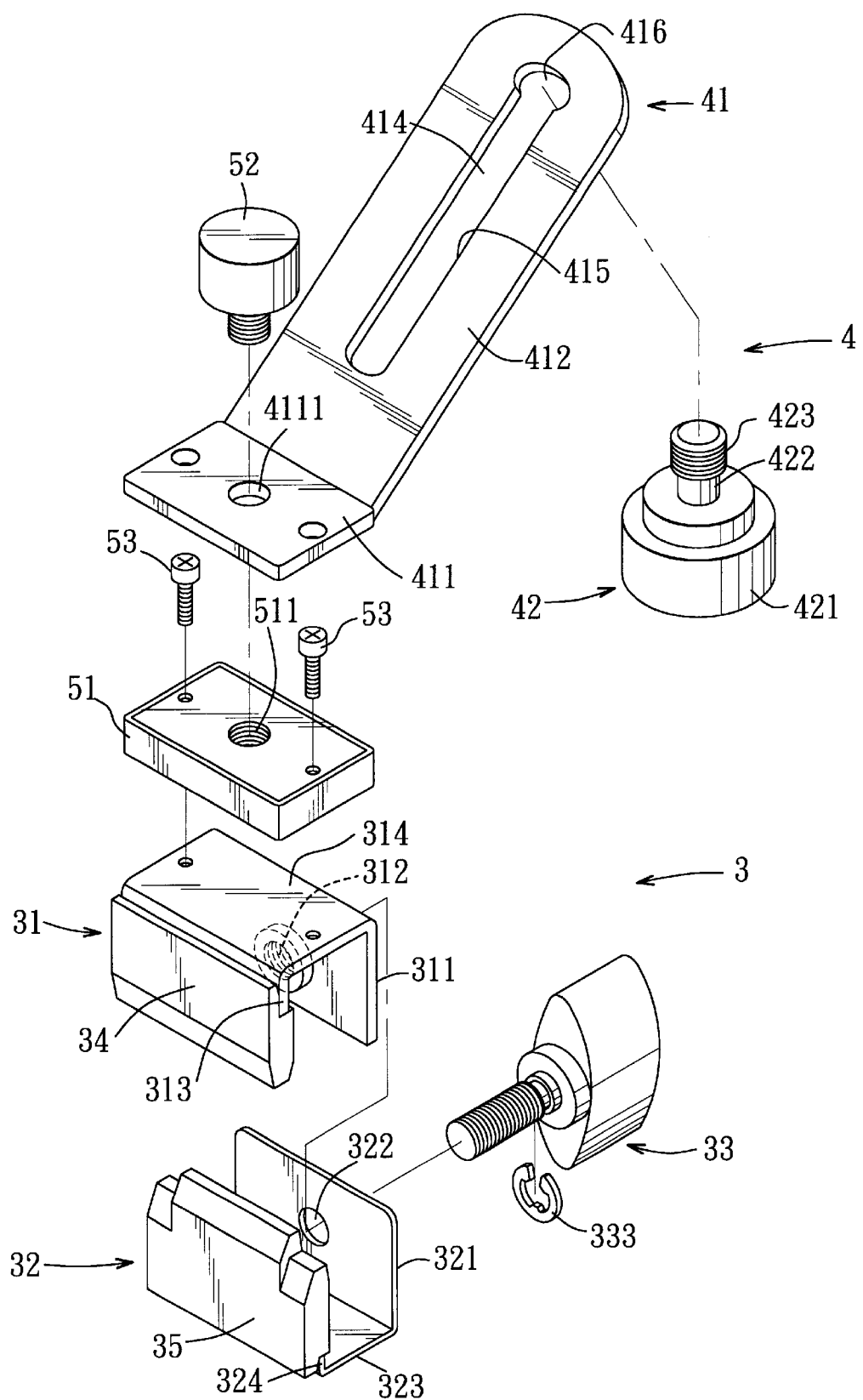
FIG. 2 is an exploded perspective view of a preferred embodiment of a positioning device according to the present invention for holding a microphone.
Figure 3:
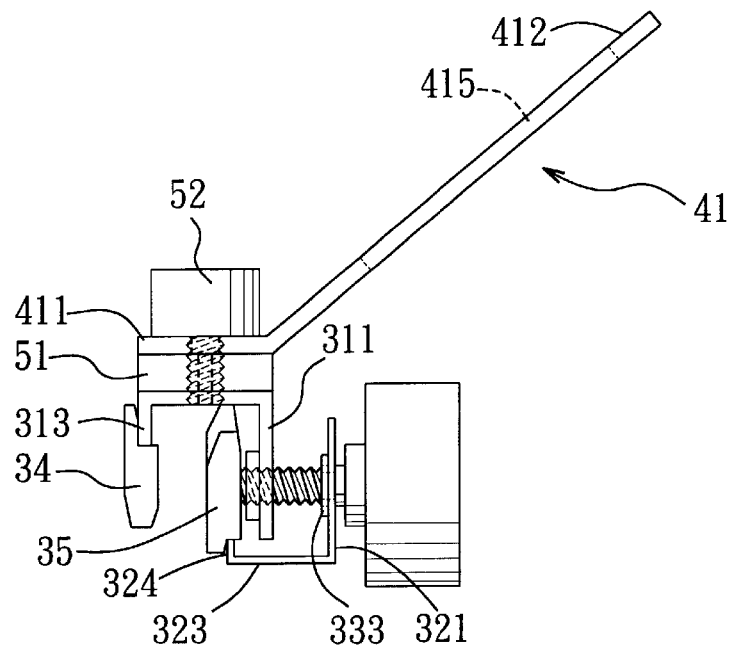
FIG. 3 is a lateral side view of the preferred embodiment shown in FIG. 2.

Referring to FIGS. 2 and 3, the preferred embodiment of a positioning device according to the present invention is adapted to hold a microphone 2 (see FIG. 5) which has a base 21 formed with a threaded mounting hole. The positioning device is shown to include a clamp unit 3, a mounting plate 41, and an adjuster bolt 42.

As illustrated, the clamp unit 3 includes a horizontal mounting portion 314.

Figure 5:
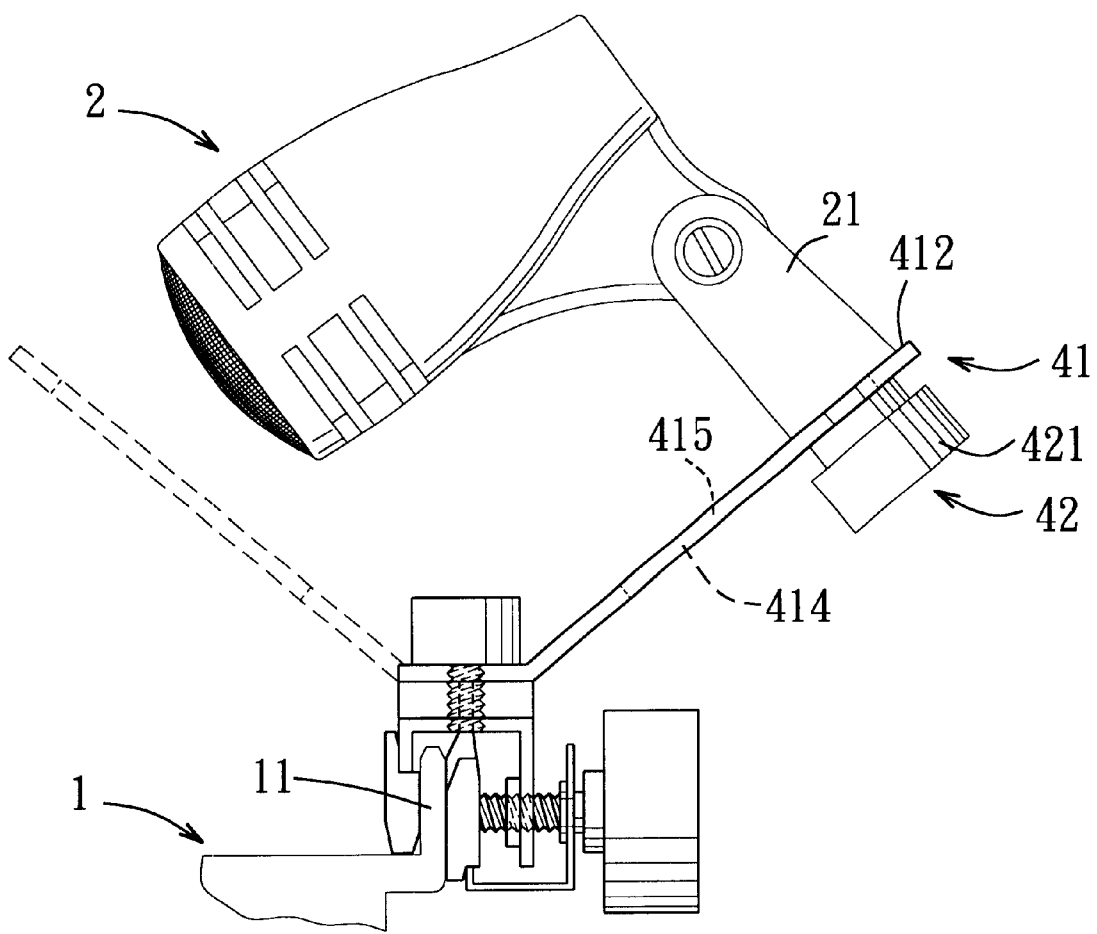
FIG. 5 illustrates how the preferred embodiment shown in FIG. 4 is adjusted in order to change the position of the microphone relative to the object, the dotted lines showing the changed position of a mounting plate.

The mounting plate 41 has a connecting plate section 411 mounted detachably and securely on the horizontal mounting portion 314 of the clamp unit 3, and a holding plate section 412 that extends outwardly from the connecting plate section 411, and that is formed with an elongated slot 414 extending along the length of the holding plate section 412. The connecting plate section 411 and the holding plate section 412 cooperatively define an obtuse angle therebetween. The holding plate section 412 can be connected to the base 21 of the microphone 2 on one side of the elongated slot 414, as best shown in FIG. 5.

The adjuster bolt 42 is disposed on the other side of the elongated slot 414, extends through the elongated slot 414 in the holding plate section 412, and has a threaded end 423 adapted to threadedly engage the threaded mounting hole in the base 21 of the microphone 2 so as to permit adjustment of the position of the microphone 2 relative to the clamp unit 3 along the elongated slot 414. Preferably, the adjuster bolt 42 has an enlarged turning knob 421 and a constricted shank portion 422 interposed between the turning knob 421 and the threaded end 423. The shank portion 422 has a cross-section smaller than that of the threaded end 423. The elongated slot 414 has a bolt-moving section 415 which has a cross-section less than that of the threaded end 423 so as to permit extension of the shank portion 422 therethrough and movement of the shank portion 422 therealong, and a bolt-entry end 416 which extends from the bolt-moving section 415 and which has a cross-section larger than that of the threaded end 423 so as to permit extension of the threaded end 423 therethrough.

The clamp unit 3 further includes a vibration-absorbing member 51 that is disposed between the horizontal mounting portion 314 of the clamp unit 3 and the connecting plate section 411 of the mounting plate 41 so as to provide cushioning effect to the microphone 2, that is secured to the horizontal mounting portion 314 by screw members 53, and that is formed with a threaded hole 511. The vibration-absorbing member 51 is preferably made from a rubber material. A fastener bolt 52 extends through a hole 4111 in the connecting plate section 411, and threadedly engages the threaded hole 511 so as to permit the mounting plate 41 to be detachably secured to the vibration-absorbing member 51 at a desired angle relative to the clamp unit 3. The position of the mounting plate 41 can be reversed, as shown by dotted lines in FIG. 5 by loosening and re-tightening the fastener bolt 52 in the threaded hole 511.

Figure 4:
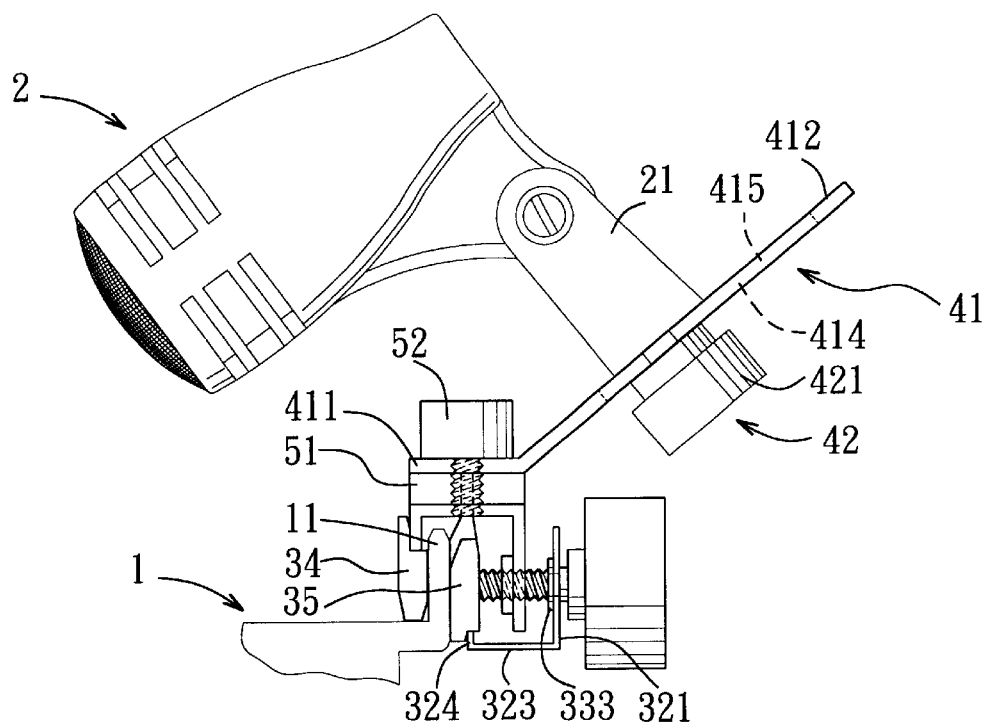
FIG. 4 illustrates how the preferred embodiment shown in FIG. 2 is mounted on the brim of an object for holding a microphone thereon.

In this embodiment, the clamp unit 3 includes an inverted U-shaped upper clamp 31 and a U-shaped lower clamp 32 that has a bottom wall 323, spaced apart left and right walls 324, 321 that extend upwardly and respectively from opposite ends of the bottom wall 323, and a through hole 322 formed in the right wall 321. The upper clamp 31 has a top wall that defines the horizontal mounting portion 314 and that is opposite to the bottom wall 323, spaced apart left and right walls 313, 311 that extend downwardly and respectively from opposite ends of the horizontal mounting portion 314, and a threaded fastener hole 312 formed in the right wall 311 of the upper clamp 31. The upper clamp 31 is disposed over the lower clamp 32 such that the left wall 324 of the lower clamp 32 is interposed between the left and right walls 313, 311 of the upper clamp 31, and such that a gap is defined between the left walls 313, 324 of the upper and lower clamps 31, 32. A locking bolt 33 extends through the through hole 322 in the right wall 321 of the lower clamp 32, engages threadedly the threaded fastener hole 312 in the right wall 311 of the upper clamp 31, and abuts against the right wall 324 of the lower clamp 32 in such a manner that rotation of the locking bolt 33 in clockwise and counterclockwise directions results in relative movement of the left walls 313, 324 of the upper and lower clamps 31, 32 so as to change the dimension of the gap. Referring to FIG. 4, when an object 11, such as a brim of a drum 1, is disposed in the gap, rotation of the locking bolt 33 results in tightening or loosening of the clamp unit 3 relative to the object 11. A C-shaped retainer ring 333 is sleeved on the locking bolt 33, and engages the lower clamp 32 to prevent removal of the locking bolt 33 from the lower clamp 32.

Two rubber sheaths 34, 35 are respectively sleeved on the left walls 313, 324 of the upper and lower clamps 31, 32 to provide enhanced clamping effect therebetween when the left walls 313, 324 move toward each other by virtue of rotation of the locking bolt 33 and to enhance a vibration-absorbing ability of the positioning device.

FIGS. 4 and 5 show how the positioning device of the present invention is employed in order to position the microphone 2 at a desired position relative to the brim 11 of the drum 1.

Figure 6:
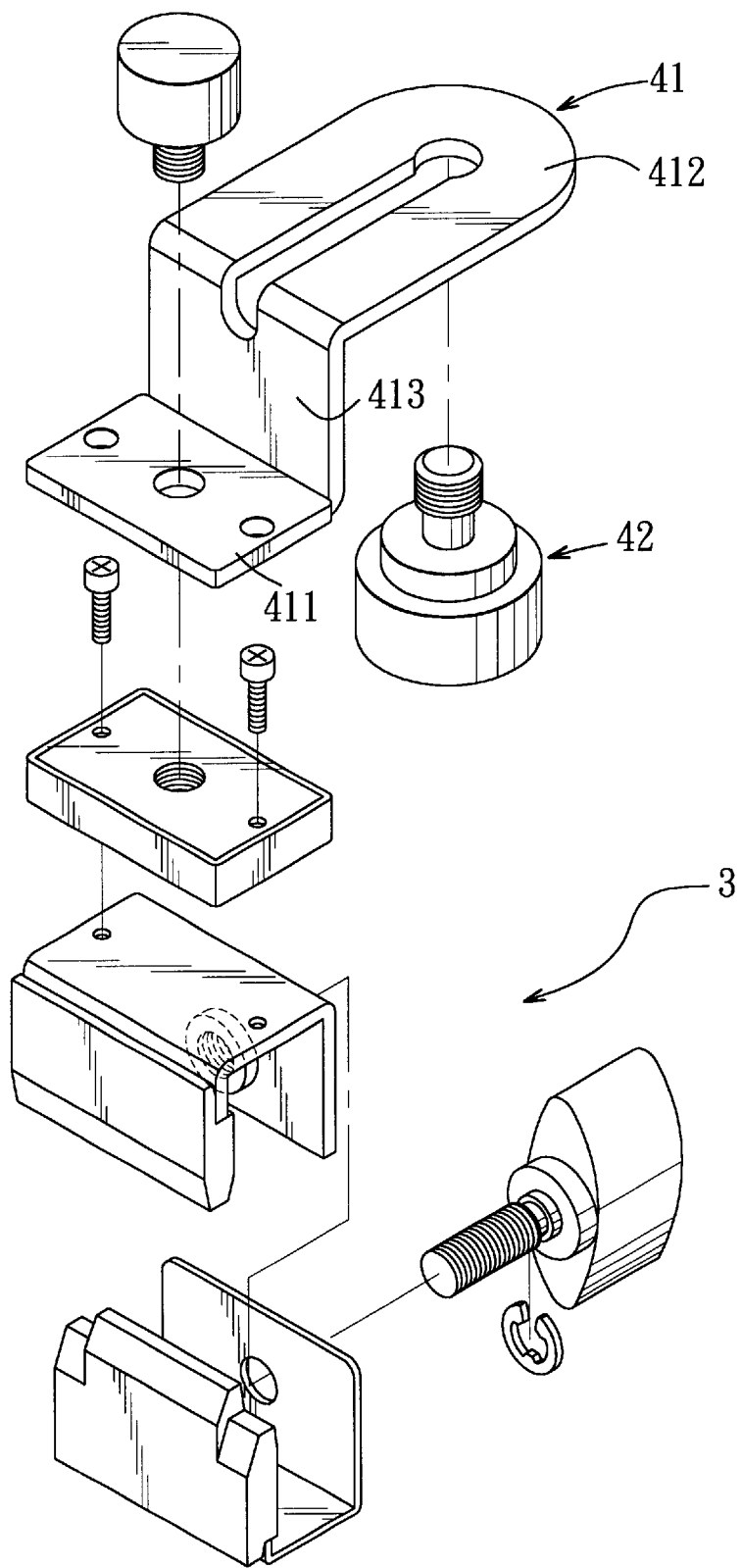
FIG. 6 is an exploded perspective view of a modified preferred embodiment of the present invention.

Referring to FIG. 6, a modified preferred embodiment of the present invention is shown to have a structure similar to that of the previous embodiment. The main difference therebetween resides in that the mounting plate 41 includes a vertical plate section 413 which extends between and which is perpendicular to the connecting plate section 411 and the holding plate section 412.

With this invention thus explained, it is apparent that numerous modifications and variations can be made without departing from the scope and spirit of this invention. It is therefore intended that this invention be limited only as indicated by the appended claims.

I claim:

1. A positioning device for a microphone which has a base formed with a threaded mounting hole, said positioning device comprising:

a clamp unit including a horizontal mounting portion;

a mounting plate having a connecting plate section mounted detachably and securely on said horizontal mounting portion of said clamp unit, and a holding plate section that extends outwardly from said connecting plate section, that is formed with an elongated slot extending along length of said holding plate section and that is adapted to be connected to the base of the microphone on one side of said elongated slot; and an adjuster bolt disposed on the other side of said elongated slot, extending through said elongated slot in said holding plate section, and adapted to threadedly engage the threaded mounting hole in the base of the microphone so as to permit adjustment of position of the microphone relative to the clamp unit along said elongated slot.

2. The positioning device as defined in claim 1, wherein said clamp unit further includes a vibration-absorbing member that is disposed between said horizontal mounting portion of said clamp unit and said connecting plate section of said mounting plate, that is secured to said horizontal mounting portion, and that is formed with a threaded hole, said positioning device further comprising a fastener bolt extending through said connecting plate section and threadedly engaging said threaded hole so as to permit said mounting plate to be detachably secured to said vibration-absorbing member.

3. The positioning device as defined in claim 1, wherein said connecting plate section and said holding plate section cooperatively define an obtuse angle therebetween.

4. The positioning device as defined in claim 3, wherein said clamp unit includes a U-shaped lower clamp having spaced apart left and right walls and a through hole formed in said right wall, an inverted U-shaped upper clamp disposed over said U-shaped lower clamp, and having a top wall defining said horizontal mounting portion, spaced apart left and right walls extending downwardly and respectively from opposite ends of said horizontal mounting portion, and a threaded fastener hole formed in said right wall of said upper clamp, and a locking bolt extending through said through hole in said right wall of said lower clamp and engaging threadedly said threaded fastener hole in said right wall of said upper clamp in such a manner that rotation of said locking bolt in clockwise and counterclockwise directions results in relative movement between said left walls of said upper and lower clamps.

5. The positioning device as defined in claim 4, wherein said clamp unit further includes two rubber sheaths respectively sleeved on said left walls of said upper and lower clamps to provide an enhanced clamping effect therebetween when said left walls move toward each other by virtue of rotation of said locking bolt.

\* \* \* \* \*